US008761250B2

(12) United States Patent
Cammas et al.

(10) Patent No.: US 8,761,250 B2
(45) Date of Patent: Jun. 24, 2014

(54) METHOD OF ESTIMATING MOTION IN SEQUENCES OF MOVING IMAGES USING DEFORMABLE MESHES, VIDEO CODER AND DECODER IMPLEMENTING THE METHOD

(75) Inventors: Nathalie Cammas, Sens de Bretagne (FR); Stéphane Pateux, Saint Gregoire (FR); Nathalie Laurent-Chatenet, Andernos les Bains (FR)

(73) Assignee: Orange, Paris (FR)

( * ) Notice: Subject to any disclaimer, the term of this patent is extended or adjusted under 35 U.S.C. 154(b) by 1425 days.

(21) Appl. No.: 11/662,756

(22) PCT Filed: Sep. 6, 2005

(86) PCT No.: PCT/FR2005/002216
§ 371 (c)(1),
(2), (4) Date: Mar. 13, 2007

(87) PCT Pub. No.: WO2006/030103
PCT Pub. Date: Mar. 23, 2006

(65) Prior Publication Data
US 2007/0291845 A1      Dec. 20, 2007

(30) Foreign Application Priority Data
Sep. 15, 2004 (FR) ..................................... 04 09778

(51) Int. Cl.
*H04N 11/02* (2006.01)
(52) U.S. Cl.
USPC ................................ 375/240.09; 375/240.16
(58) Field of Classification Search
USPC .............. 375/240.09, 240.16, 240.25, 240.26
See application file for complete search history.

(56) References Cited

U.S. PATENT DOCUMENTS 5,751,365 A * 5/1998 Yokoyama ................. 348/416.1
5,999,651 A * 12/1999 Chang et al. .................. 382/215

(Continued)

FOREIGN PATENT DOCUMENTS

| WO | WO 00/14969 A1 | 3/2000 |
| WO | WO 01/43446 A1 | 6/2001 |
| WO | WO 02/060184 A1 | 8/2002 |

OTHER PUBLICATIONS

Laurent, N. "Hierarchical mesh-based global motion estimation, including occlusion area detection", 7th IEEE International Conference on Image Processing, Vancouver, Canada. Sep. 2000. pp. 620-623.*

(Continued)

*Primary Examiner* — Zachary A Davis
(74) *Attorney, Agent, or Firm* — Drinker Biddle & Reath LLP

(57) ABSTRACT

The invention concerns a method which consists in analyzing a field of motion of images, estimated by using a first mesh, to detect a faulty area in the first mesh, and in locating a rupture line in said area; then generating a second mesh including a faultless part consisting of meshes of the first mesh outside the faulty area and two sub-meshes which overlap in a region including the rupture line. Each of the two sub-meshes includes respective meshes delimited by nodes including nodes shared with the faultless part, located at the boundary of the faulty area, and additional nodes not belonging to the faultless part, the rupture line being located between the respective nodes of the two sub-meshes shared with the faultless part. Said second mesh is used to finally estimate the field of motion in the group of images concerned.

18 Claims, 9 Drawing Sheets

(56) References Cited

U.S. PATENT DOCUMENTS

| | | | |
|---|---|---|---|
| 6,963,605 B2 * | 11/2005 | Laurent-Chatenet | 375/240 |
| 7,221,366 B2 * | 5/2007 | Uyttendaele et al. | 345/427 |
| 2003/0063672 A1 * | 4/2003 | Laurent-Chatenet | 375/240.16 |

OTHER PUBLICATIONS

Maruant, G. et al. "Mesh and 'Crack Lines': Application to object-based motion estimation and higher scalability", 7th IEEE International Conference on Image Processing, Vancouver, Canada. Sep. 2000. pp. 554-557.*

Marquant, "Representation par Maillage Adaptatif Deformable Pour La Manipulation Et La Communication D'Objects Video," paragraph 10.3, pp. 228-235 (2000).

Bove et al., "Real-Time Decoding and Display of Structured Video," Multimedia Computing and Systems, 1994, Proceedings of the International Conference on, Boston, MA, USA, May 15-19, 1994, Los Alamitos, CA, USA, IEEE Comput. Soc., pp. 456-462 (May 15, 1994).

Comaniciu et al., "Mean Shift: A Robust Approach Toward Feature Space Analysis," IEEE Transaction on Pattern Analysis and Machine Intelligence, vol. 24, No. 5, pp. 603-619 (May 2002).

Lechat et al., "Combined Mesh Based Image Representation and Motion Estimation, Application to Video Coding," Image Processing, 1998, ICIP 98, Proceedings, 1998 International Conference on, Chicago, IL, USA, Oct. 4-7, 1998, Los Alamitos, CA, USA, IEEE Comput. Soc., US, vol. 2, pp. 909-913 (Oct. 4, 1998).

Marquant, "Representation par Maillage Adaptatif Deformable Pour La Manipulation Et La Communication D'Objects Video," No. 2453, pp. 5-17, 19, pp. 190-199, paragraphs 8.4, .8.5, pp. 223-237, chapter 10, pp. 228-231, paragraph 10.3.1, figures 10.5, 10.6 (2000).

* cited by examiner

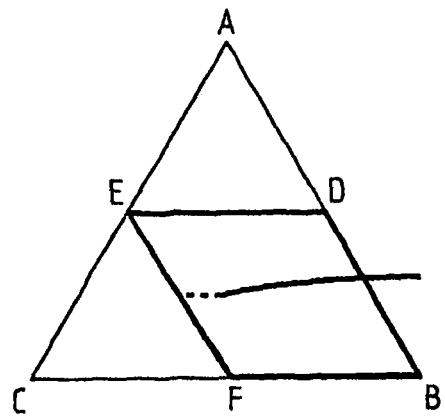
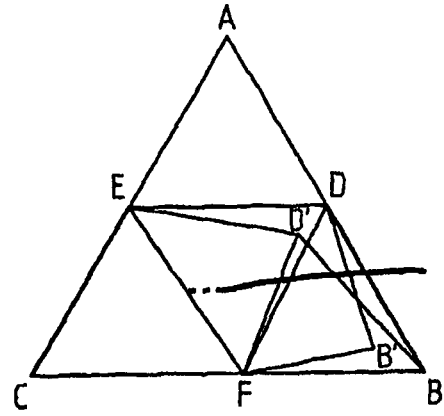
FIG. 11a   FIG. 11b
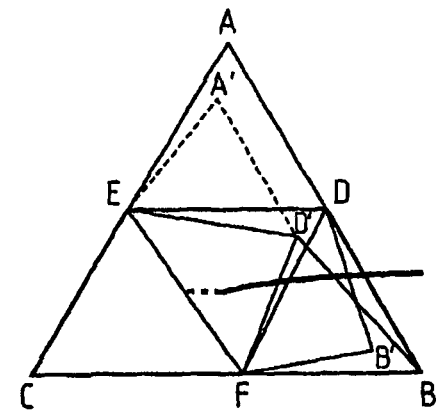
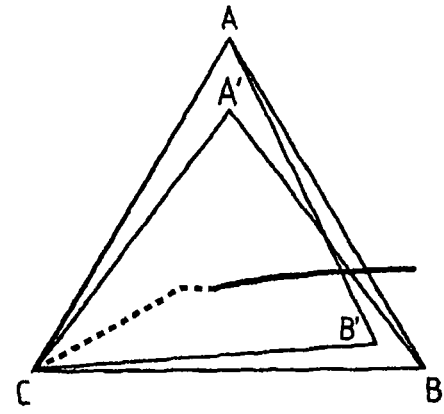
FIG. 11c   FIG. 11d

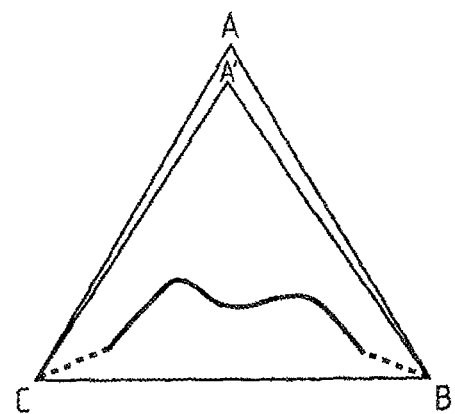
FIG. 12a
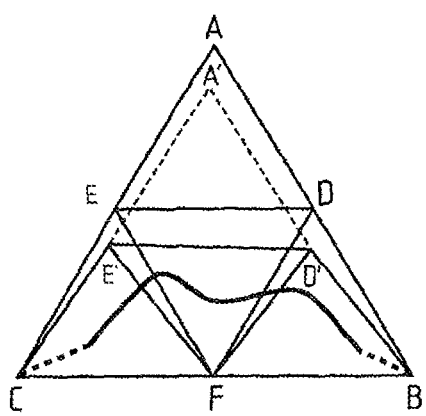 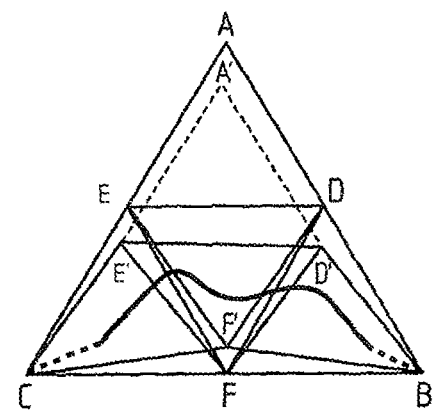
FIG. 12b         FIG. 12c

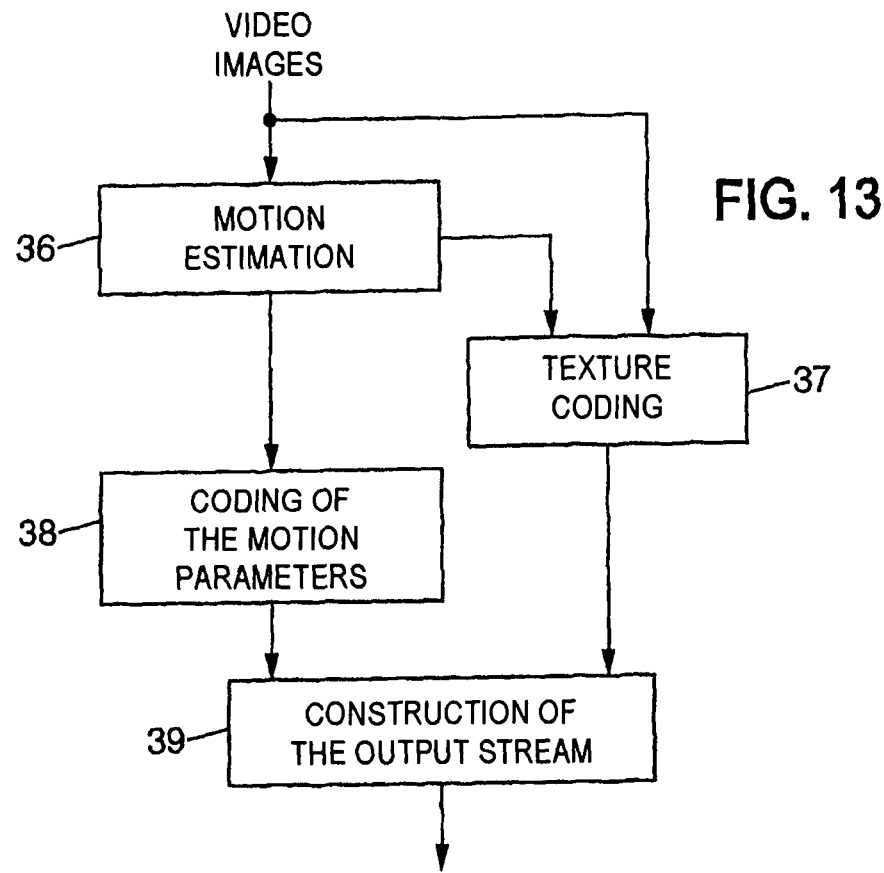
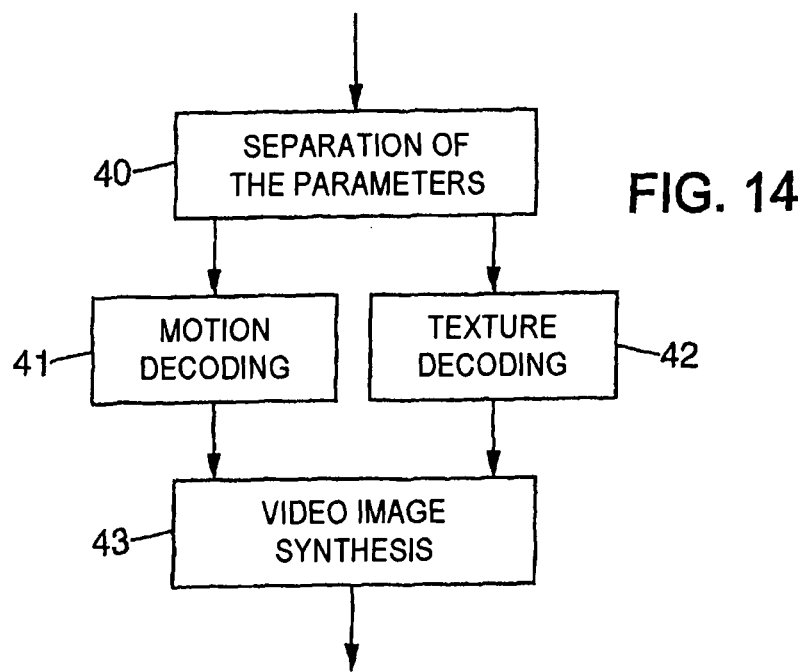

METHOD OF ESTIMATING MOTION IN SEQUENCES OF MOVING IMAGES USING DEFORMABLE MESHES, VIDEO CODER AND DECODER IMPLEMENTING THE METHOD

CROSS-REFERENCE TO RELATED APPLICATIONS

This application is the U.S. national phase of the International Patent Application No. PCT/FR2005/002216 filed Sep. 6, 2005, which claims the benefit of French Application No. 04 09778 filed Sep. 15, 2004, the entire content of which is incorporated herein by reference.

BACKGROUND OF THE INVENTION

The present invention relates to the digital processing of moving images, and more particularly to techniques for estimating motion between successive images of a sequence.

Most video coding schemes (in particular MPEG-1,2,4 and ITU-T H26x) use a representation of the motion with the aid of translations over a blockwise partitioning of the images. This motion model generates numerous problems. It is in large part the source of the block effect often visible on decoding with the current video coding schemes, and it offers a representation model that is not well suited to certain types of motion (zooms, rotations, etc.).

Other modes of motion representation have been proposed so as to alleviate these defects. Among these modes, it is possible to point out "active meshes". In this mode of representation, the motion is represented by means of a set of values defined on the nodes of a mesh positioned on an image. An interpolation technique is used to deduce on the basis of the values stored at the nodes of this mesh, a motion vector at any point of the image. Typically, this may involve a Lagrange type interpolation, that is to say the motion vector assigned to a point of the image is an affine function of the vectors calculated for the neighboring nodes.

It is thus possible to substitute the motion compensation mode of a video coder of MPEG or other type by a mesh-based motion compensation mode. It is also possible to use the meshes to decorrelate the motion and texture information of a video sequence so as to achieve a coding scheme of analysis-synthesis type.

These active meshes offer at one and the same time richer motion models and the possibility of improved coding effectiveness by virtue of a more effective coding of the motion information, in particular when hierarchical meshes are used (see for example WO 00/14969).

The deformable meshes define a continuous representation of a motion field, while the real motion of a video sequence is generally discontinuous in nature. Thus, when various planes and objects overlap in a scene, occultation and exposure zones appear, generating discontinuity lines.

Modeling of such artefacts by a global mesh, as opposed to the meshes segmented according to the constituent video objects making up the scene, constitutes a difficulty which cannot be solved without modification of the representation model. The issue is to eliminate this visual degradation and limit it in analysis terms, by determining the zones of discontinuity.

Conventionally, this type of disturbance of the real motion field leads to mesh cell inversions in its meshed representation.

A post-processing technique can be implemented to solve this problem. One of these techniques proceeds by a posteriori correction, and consists in applying the motion vectors such as the calculation produces them, in detecting those which are defective then in correcting their value. Another of these techniques proceeds iteratively, by adding a part of the anticipated displacement to nodes at each iteration in such a way that there is no inversion, and by continuing the iterations until the process converges.

The post-processing techniques act once the motion estimation has been carried out. Accordingly, the result is suboptimal since the motion vectors are corrected independently of their contribution to the minimization of the prediction error.

An improvement consists in optimizing the motion field by taking into account non-inversion constraints in the optimization process. For this purpose, the motion estimation is adapted by adding to the quadratic prediction error an augmented Lagrangian making it possible to correct the deformation of the mesh cells when their area approximates zero. The latter technique actually makes it possible to determine the optimal solution, but on condition that the latter represents a continuous field. However, the nature of a video sequence is usually discontinuous.

Another technique, introduced in WO 01/43446, consists in identifying the discontinuity zones so as to restore them, by monitoring the appearance or disappearance of objects. A first motion estimation is performed between two successive instants $t_1$ and $t_2$ without preventing mesh cell inversions. By pinpointing the inversions on completion of this first calculation with the aid of geometric criteria, the discontinuity zones are detected. The process then consists in effecting a new motion estimation between $t_1$ and $t_2$, while excluding from the optimization criterion the contributions of the defective zones, containing at least one inversion, so as to minimize the prediction error between the two images considered. This reoptimization makes it possible to determine the optimal motion vectors for the continuous zone (admitting a bijection between $t_1$ and $t_2$) and thus to avoid the disturbance of the motion vector values obtained in the preceding optimization, generated by the discontinuity zones. The defective zones form the subject of a frequency or spatial approximation with image compression, and they are excluded from the method of optimization by tracking of video objects.

The various known techniques endeavor to render a discontinuous motion field continuous, by imposing a motion calculated on the basis of the continuous zones in the discontinuous zones. This results in a false motion and a poor temporal prediction of the texture in the discontinuous zones, and therefore a coding cost-overhead.

The technique which is aimed at excluding the discontinuous zones does not impose any motion in these zones and codes them differently. However, in the case of a significant number of discontinuous zones, there are as many zones to be coded differently, involving a cost overhead in coding the headers of these streams. Moreover, within the framework of a scalable coding this technique is relatively expensive.

An object of the invention is to estimate the motion of a video sequence with the aid of a 2D mesh and to represent this motion in a discontinuous manner so as to best represent the real motion field.

SUMMARY OF THE INVENTION

The invention thus proposes a method of estimating motion in a sequence of moving digital images, comprising the steps of:

generating a first mesh, comprising mesh cells delimited by nodes, to be applied to a reference image of the sequence;

estimating a first displacement field in a group of images including the reference image, by assigning to each point of an image a displacement value calculated according to values assigned to the nodes delimiting a mesh cell of the first mesh to which said point belongs;

detecting at least one discontinuity zone in the first mesh by analyzing the first displacement field, each discontinuity zone including at least one mesh cell fulfilling a mesh cell deformation criterion in the group of images;

in each detected discontinuity zone, determining at least one break line appearing in the group of images;

generating a second mesh to be applied to the reference image, comprising a regular part made up of mesh cells of the first mesh which belong to no discontinuity zone and, for at least one detected discontinuity zone, at least two sub-meshes which overlap in a region including the break line determined in said discontinuity zone, each of the two sub-meshes comprising respective mesh cells delimited by nodes including nodes shared with the regular part, situated at a boundary of the discontinuity zone, and additional nodes not belonging to the regular part, the break line being situated between the respective nodes of the two sub-meshes shared with the regular part; and estimating a second displacement field in the group of images, by assigning to each point situated in a detected discontinuity zone a displacement value calculated according to values assigned to the nodes delimiting a selected mesh cell of the second mesh to which said point belongs, the selected mesh cell depending on the position of said point with respect to the break line determined in said discontinuity zone.

The method performs a global optimization to determine the motion. No a priori constraints are imposed on the criteria to be optimized, and one also avoids excluding from the calculation the discontinuity zones frequently present in the moving images. The motion estimation carried out may therefore be optimal, including in the discontinuity zones, in as much as the break lines are tagged in a reliable manner. The estimated motion will be able thereafter to be used by a video coder. Within this framework, it will allow good prediction of the images of the sequence even in the discontinuity zones of the mesh and will allow improvement in the cost of coding of the video sequence. Parameters representing the estimated motion will then be transmitted to a decoder, or recorded in memory with a view to a subsequent decoding.

The motion estimation method is compatible with the use of hierarchical meshes, with which the estimations of displacement fields are effected by going from the coarsest hierarchical level (1) to the finest hierarchical level (nivfin) of the meshes. The discontinuity zone is preferably detected as an adjoining set of mesh cells of the finest hierarchical level fulfilling the mesh cell deformation criterion. It is thereafter defined at the higher hierarchical levels as being made up of at least one mesh cell including at least one respective mesh cell of the finest hierarchical level fulfilling the mesh cell deformation criterion.

Advantageously, the two sub-meshes of the second mesh are generated beginning with level nivfin, and the mesh cells of the higher levels are thereafter generated during a progressive backtrack up the hierarchy. The backtrack from a hierarchical level n to an immediately higher hierarchical level n−1 comprises the following steps for each of the sub-meshes and for $1 \leq n \leq nivFin$:

/a/ integrating each mesh cell of said sub-mesh previously defined at level n with a new mesh cell of said sub-mesh generated at level n−1;

/b/ taking n'=n;

/c/ if said new mesh cell of level n'−1 cannot be completed with mesh cells of said sub-mesh already generated at level n', generating at level n' at least one new mesh cell of said sub-mesh to complete said new mesh cell of level n'−1; and /d/ if n'<nivfin, increasing n' by one unit and repeating from step /c/.

In a preferred embodiment of the method, respective depth values are assigned to the nodes of the regular part and to the additional nodes of each sub-mesh of the second mesh. The value assigned to the additional nodes of a sub-mesh generated for a detected discontinuity zone is dependent on the position of said sub-mesh with respect to the break line determined in said zone. The step of estimating the second displacement field comprises for each point of an image belonging to a mesh cell of the regular part of the second mesh and to at least one mesh cell of a sub-mesh, calculating for each mesh cell including this point a weighted sum of the depth values respectively assigned to the nodes delimiting said mesh cell, and selecting, for the assignment of a displacement value to said point, the mesh cell for which the weighted sum calculated is a maximum.

The use of these depth values makes it possible to account for the existence of several planes coexisting in the group of images. When there are more than two planes, the relative depth values will have to be communicated to the decoder for the synthesis of the motion.

Other aspects of the invention pertain to a device for estimating motion in a sequence of moving digital images, comprising means adapted to implement a method such as defined above, as well as to a computer program to be installed in an apparatus for processing moving images, comprising instructions for implementing the steps of a motion estimation method such as defined above during an execution of the program by a computing unit of said apparatus.

The invention also proposes a video coder, comprising means for estimating motion in a sequence of moving digital images and means for constructing an output stream including motion parameters produced by the motion estimation means, wherein the motion estimation means are designed to operate in accordance with a method such as defined above.

Yet another aspect of the invention pertains to a signal representative of a sequence of moving digital images, comprising a representation of motion parameters obtained by executing a method such as defined above, as well as to a recording medium, on which such a signal is recorded. The motion parameters comprise, for a group of images including a reference image:

first motion parameters indicating, in a first mesh to be applied to the reference image, mesh cells making up at least one discontinuity zone in the group of images;

second motion parameters for positioning at least one break line in each discontinuity zone; and third motion parameters describing displacement values assigned to the nodes of a second mesh to be applied to the reference image, the second mesh comprising a regular part made up of mesh cells of the first mesh which belong to no discontinuity zone and, for at least one discontinuity zone, at least two sub-meshes which overlap in a region including the break line positioned in said discontinuity zone, each of the two sub-meshes comprising respective mesh cells delimited by nodes including nodes shared with the regular part, situated at a boundary of the discontinuity zone, and additional nodes not belonging to the regular part, the break line being situated between the respective nodes of the two sub-meshes shared with the regular part.

The motion parameters represented in the signal can be supplemented with parameters indicating depth values respectively assigned to the nodes of the regular part and to the additional nodes of each sub-mesh of the second mesh.

The invention is embodied also on the motion decoding side, carried out in a video decoder or other apparatus for processing moving images.

The invention thus proposes a method of decoding motion in a sequence of moving digital images, with the aid of image meshes comprising mesh cells delimited by nodes. This method comprises the steps of:

receiving an input stream including motion parameters such as defined above;

generating the second mesh on the basis of the first and second motion parameters; and generating a displacement field in the group of images, by assigning to each node of the second mesh displacement values obtained on the basis of the third motion parameters and by assigning to each point situated in a detected discontinuity zone a displacement value calculated according to the values assigned to the nodes delimiting a selected mesh cell of the second mesh to which said point belongs, the selected mesh cell depending on the position of said point with respect to the break line determined in said discontinuity zone.

Other aspects of the invention pertain to a device for decoding motion in a sequence of moving digital images, comprising means adapted to implement a method of decoding motion such as defined above, as well as to a computer program to be installed in an apparatus for processing moving images, comprising instructions for implementing the steps of a method of decoding motion such as defined above during an execution of the program by a computing unit of said apparatus.

The invention further proposes a video decoder, comprising motion decoding means and synthesis means for constructing a sequence of moving digital images taking into account a displacement field generated by the motion decoding means, which are designed to operate in accordance with a method of decoding motion such as defined above.

BRIEF DESCRIPTION OF THE DRAWINGS

FIGS. 9a-d, 10a-d, 11a-d and 12a-c are diagrams illustrating the generation of the mesh in higher levels of a hierarchical mesh in an embodiment of the invention; and FIGS. 13 and 14 are simplified schematic diagrams of a video coder and of a video decoder according to the invention.

DETAILED DESCRIPTION OF THE INVENTION

Figure 1:
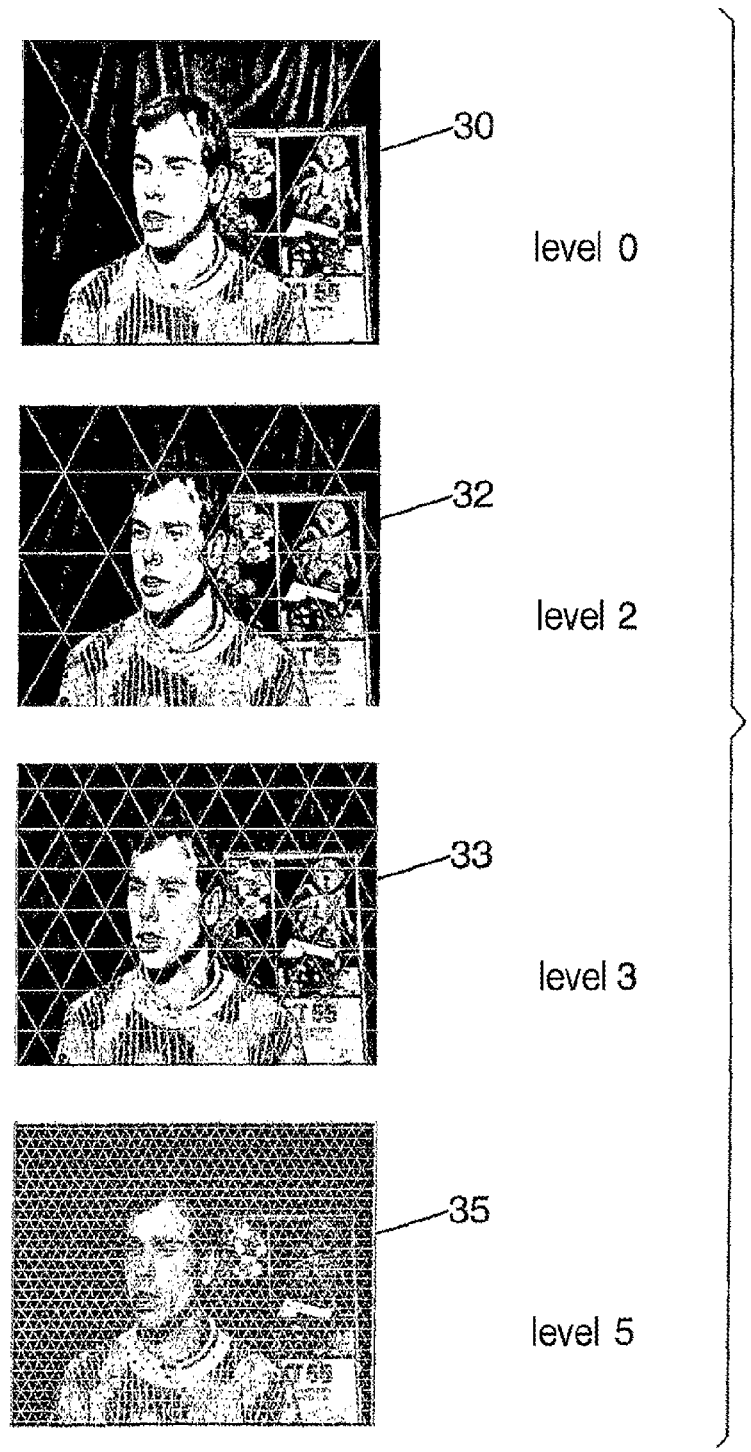
FIG. 1 is a diagram illustrating the hierarchical meshing of an image.

Consider a sequence of digital images $I(x,y,t)$, where $x$, $y$ designate the coordinates of the pixels in the field of the image and $t$ the discretized time, assumed here increasing by 1 at each new image of the sequence. The values $I(x,y,t)$ associated with the pixels are typically luminance values.

The motion estimation consists in generating, for each point with coordinates $(x,y)$ in the image $I(x,y,t)$, a displacement vector $D(x,y,t)=(d_x,d_y)$ making it possible to construct, from the image $I(x,y,t-1)$, a displaced image $I'(x,y,t)=I(x-d_x, y-d_y, t-1)$ which is a good approximation of $I(x,y,t)$.

The calculation is performed on an estimation support $\Omega$. It consists in determining the displacement field $D(x,y,t)$ which minimizes a functional $\phi(t)$ of the form:

$$\Phi(t) = \sum_{(x,y) \in \Omega} \rho(I(x-d_x, y-d_y, t-1), I(x, y, t)) \quad (1)$$

where $\rho(A,B)$ is a metric the most common form of which is $\rho(A,B)=(A-B)^2$.

The use of a mesh of the images makes it possible to reduce the number of unknowns. Only the displacement vectors $D(x_i[t], y_i[t], t)$ of the points situated at the nodes i of the mesh are searched for. Away from these nodes, the displacement field $D(x,y,t)$ is interpolated, for example according to an affine procedure:

$$D(x, y, t) = \sum_i w_i(x, y, t) \cdot D(x_i[t], y_i[t], t) \quad (2)$$

where the weights $w_i(x,y,t)$ represent coordinates of the point $(x,y)$ expressed with respect to the position of the nodes i in the image at time t.

A convenient mesh is the triangular mesh, in which each point $(x,y)$ is considered to belong to a triangle whose vertices are nodes i, j, k of the mesh with respective coordinates $(x_i[t],y_i[t])$, $(x_j[t],y_j[t])$ and $(x_k[t],y_k[t])$ at time t. The interpolation weights associated with the point $(x,y)$ at time t are its barycentric coordinates in the triangle, given by:

$$w_{i'}(x,y,t)=0 \text{ if } i' \neq i,j,k \quad (3)$$

$$w_i(x, y, t) = \frac{x_j[t] \cdot y_k[t] - x_k[t] \cdot y_j[t] + (y_j[t] - y_k[t]) \cdot x - (x_j[t] - x_k[t]) \cdot y}{\pi_{i,j,k}[t]} \quad (4)$$

$$w_j(x, y, t) = \frac{x_k[t] \cdot y_i[t] - x_i[t] \cdot y_k[t] + (y_k[t] - y_i[t]) \cdot x - (x_k[t] - x_i[t]) \cdot y}{\pi_{i,j,k}[t]} \quad (5)$$

$$w_k(x, y, t) = \frac{x_i[t] \cdot y_j[t] - x_j[t] \cdot y_i[t] + (y_i[t] - y_j[t]) \cdot x - (x_i[t] - x_j[t]) \cdot y}{\pi_{i,j,k}[t]} \quad (6)$$

where $\pi_{i,j,k}[t]=x_j[t] \cdot y_k[t]-x_k[t] \cdot y_j[t]+x_k[t] \cdot y_i[t]-x_i[t] \cdot y_k[t]+x_i[t] \cdot y_j[t]-x_j[t] \cdot y_i[t]$ is a vector product associated with the triangle at time t.

The calculation is conducted on a group of consecutive images of the sequence, typically of the order of about ten images. The mesh is defined on the first image of the group (t=0), customarily by a network of equilateral triangles. The displacement vectors $D(x_i[1], y_i([1],1)$ are estimated by minimization of the functional $\phi(1)$, for example by applying a gradient descent procedure of Gauss-Seidel or analogous type. The positions of the nodes i of the mesh at the time 1 are deduced from this through the formula $(x_i[1],y_i[1])=(x_i[0],y_i[0])+D(x_i[1],y_i[1], 1)$. This process is repeated until the last image of the group (t=2, 3, 4, etc.): estimation of the displacement vectors $D(x_i[t],y_i[t],t)$ by minimization of $\phi(t)$, then calculation of the positions of the nodes of the mesh at time t:

$$(x_i[t],y_i[t])=(x_i[t-1],y_i[t-1])+D(x_i[t],y_i[t],t)$$

The estimation of the motion is advantageously carried out with the aid of a hierarchical mesh, which, in a manner known per se, ensures better convergence of the system. A certain fineness of mesh is necessary for faithfully representing the motion within the image. But in the event of strong motion, the preceding minimization technique might not converge if it is applied directly to a fine mesh. Moreover, the use of very fine meshes can cause an instability of the system due to the overly large number of parameters.

FIG. 1 shows an exemplary hierarchical mesh. The hierarchical representation consists of several representation levels. The lowest level 30 (level 0 in the figure) possesses a coarse field, with only three nodes to define the mesh. On going towards the finer levels 32, 33, 35, the field gets progressively denser and the number of nodes of the mesh increases. The quality of the motion varies with the levels, the low level 30 representing the dominant motion of the scene, and the fine levels refining the dominant motion to represent the local motions. The number of levels of the hierarchical mesh is an adjustable parameter of the estimation phase, it can vary according to the sequence to be estimated.

In the technique of motion estimation by hierarchical meshing, several levels of hierarchical mesh are generated on the images. One begins by estimating the motion on the coarsest level 30, then one passes to the following level, beginning the gradient descent on the basis of nodal displacement values deduced from those estimated at the preceding level: the nodes common to the two levels receive initial displacement vectors equal to those which have just been estimated, and the nodes added at the finer level receive initial displacement vectors calculated by spatial interpolation. At the end of the iterations, it is the displacement vectors estimated at the finest level that are quantified so as to be transmitted to the decoder.

The technique of motion estimation by hierarchical meshing is combinable with a multi-resolution estimation technique, in which one works on a pyramid of filtered and decimated images constructed on the basis of the starting images. The motion estimation in a level of the hierarchical mesh is then performed on the basis of images sampled at a suitable resolution level.

Figure 2:
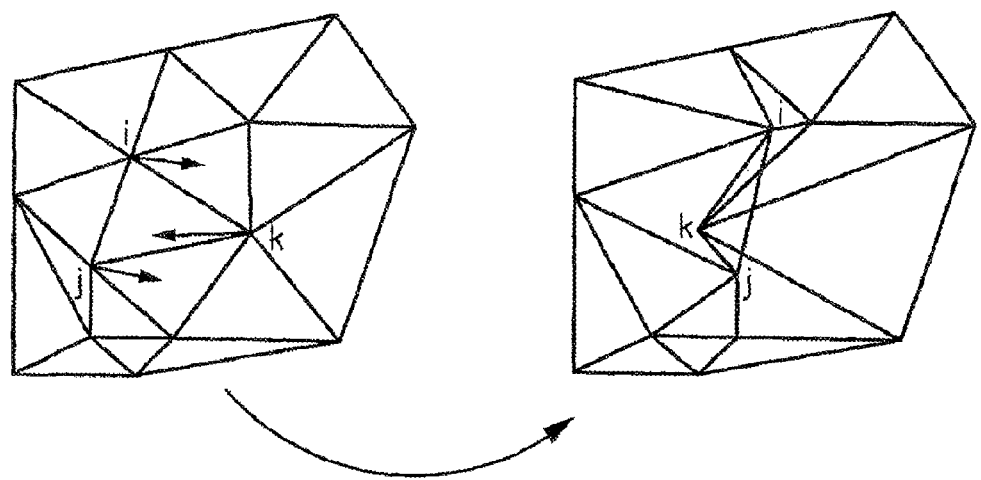
FIG. 2 is a diagram illustrating the mesh cell inversion phenomenon.

A general problem with mesh-based motion estimation techniques is that of mesh cell inversions. This problem is illustrated by FIG. 2, where we see the mesh of an image at two successive instants with, on the left part of the figure, an example of displacement vectors estimated between these two instants at the nodes i, j, k forming the vertices of an elementary triangle of the mesh. The inversion of this triangle results from node k crossing the straight line passing through nodes i and j.

Generally, the inversion of a triangle i, j, k corresponds to a change of sign of the vector product $\pi_{i,j,k}[t]$. Such artefacts greatly disturb the motion estimation. They are generally due to relative motions of objects in various planes of the filmed scene. The illustration of FIG. 2 is very simplified since a single triangle inverts (passing through a triangle of zero area). In practice, the overlaps usually occur on discontinuity zones having a certain expanse in the image.

With a hierarchical mesh, the mesh cell inversions naturally have a larger probability of occurring in the fine levels that in the coarse levels.

To treat the problem of mesh cell inversions, the invention uses a tagging of the discontinuity zones and of the break lines that they contain. A remeshing of the image is effected in the discontinuity zones, with the aid of multiple sub-meshes, anchored to the initial mesh on either side of the break lines. The multiple sub-meshes generated in a discontinuity zone extend beyond the break line, so that they overlap mutually. They may even protrude outside of the discontinuity zone. To estimate the displacement of an image point situated in the discontinuity zone with the aid of an interpolation formula such as (2), reference is made to the nodes of one of the sub-meshes, selected as a function of the position of the point with respect to the break line or lines. Thus, the sub-meshes make it possible to account for various planes present in the sequence of images, their use depending on the objects which appear or disappear in the scene.

The invention makes it possible to manage the motion discontinuity zones without making them defective or rejecting them at the time of coding. When an overlap or exposure is detected, the principle is to cut the mesh locally just where the discontinuity is created, and to transform the mesh into a so-called "non-manifold" mesh. A non-manifold mesh is a mesh whose edges can be shared by more than two mesh cells. It makes it possible to estimate the motion in the video sequence and to model a discontinuous motion field. An advantage is that it is thus possible to take into account the discontinuity zones at the time of coding in the same manner as the continuous zones.

Figure 3:
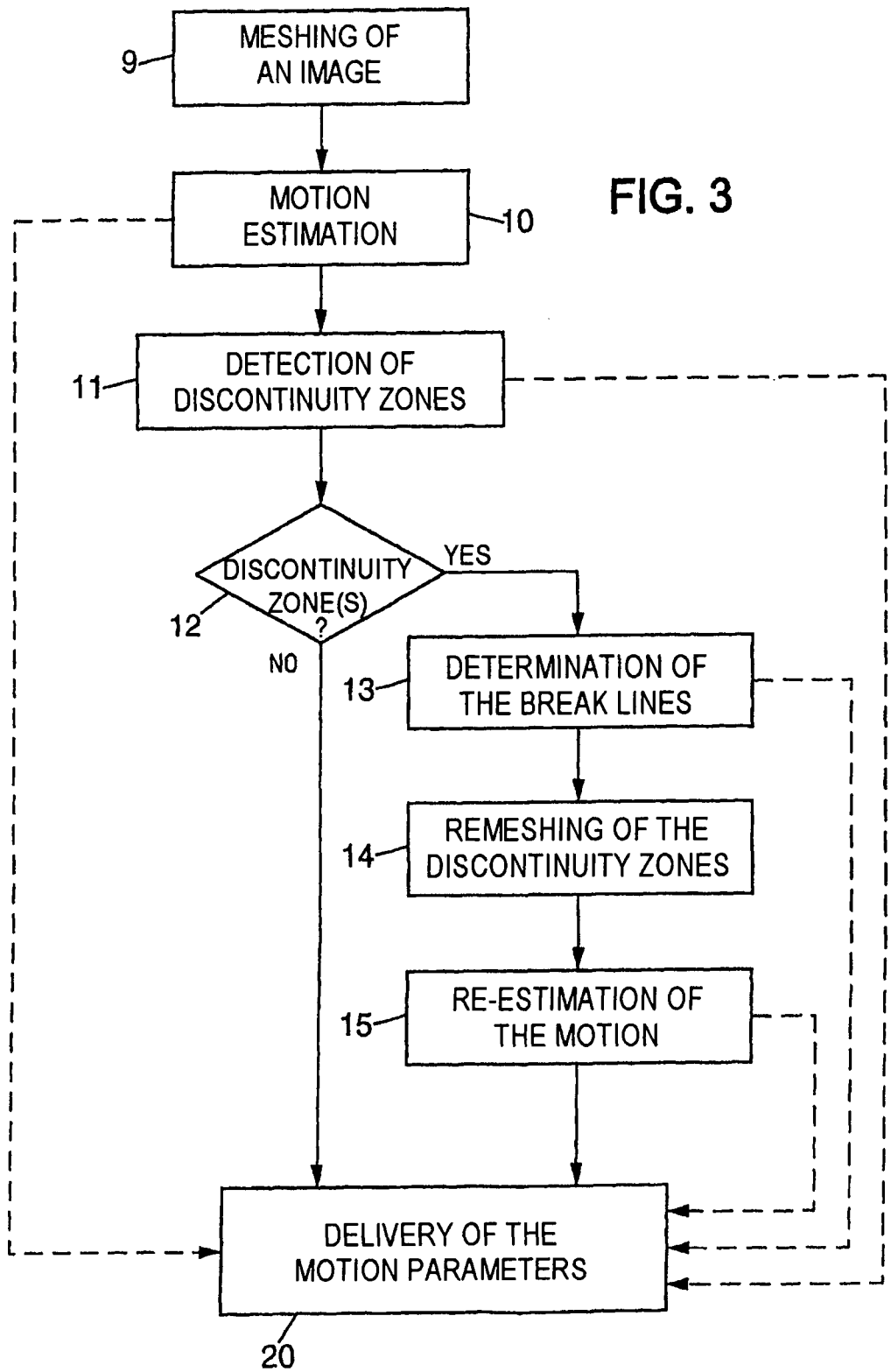
FIG. 3 is a flowchart of a motion estimation method according to the invention.

FIG. 3 shows a flowchart of a motion estimation method according to the invention.

The first step 9 consists in defining the initial mesh on an image of a video sequence to be coded. Then in step 10, one undertakes a first estimation of the motion field in a group of T consecutive images. This estimation is effected in a conventional manner with the aid of a preferably hierarchical mesh, for example according to the procedure explained above. In the course of this calculation, certain triangular mesh cells may invert or deform too greatly.

Thereafter, the method comprises a step 11 for detecting the discontinuity zones in the initial mesh.

The discontinuity zones each consist of an adjoining set of degenerate mesh cells defined at the finest hierarchical level. They include at least the triangles which invert in the course of the motion estimation 10. These triangles are readily detectable according to the vector products $\pi_{i,j,k}[t]$ which have been calculated in step 10 (for the interpolation of the displacements in the functional to be minimized) in relation to the various triangles of the mesh at the finest hierarchical level and at the successive instants t=0, 1, 2, ..., T−1, T. The triangles can be initially oriented in such a way that the vector products $\pi_{i,j,k}[t]$ are all positive. A mesh cell inversion is then manifested by a negative vector product. The detection can be generalized to include in a discontinuity zone a triangular mesh cell i, j, k whose area (equal to half the absolute value of the vector product $\pi_{i,j,k}[t]$) becomes close to zero, that is to say less than a predefined threshold, for at least one instant t.

The detection of the degenerate triangles, to be included in a discontinuity zone, can more generally comprise a study of the deformation of the triangles between the image at the time 0 and the image at time T. If the deformation of a mesh cell exceeds a certain threshold, this mesh cell is considered to be degenerate.

An adjoining set of degenerate mesh cells forms a discontinuity zone. It is the zone where a discontinuity is apparent in the motion. It is defined at the finest hierarchical level, and the triangular mesh cells of which it is composed (or the nodes which border it) form part of the parameters which will be transmitted to the decoder. The contour of the discontinuity zone can also be represented by splines.

If no discontinuity zone is detected in step 11 (test 12), the motion estimation method terminates in step 20 where the parameters of the motion which will be quantified so as to be transmitted to the video decoder are delivered. In this case, these parameters are those obtained in step 10 and to which is added an indicator signalling that no discontinuity zone has been detected (continuous motion).

If one or more discontinuity zones is detected in the group of images, one first undertakes a determination of every break line in each discontinuity zone detected (step 13).

A break line is positioned on the contour of an object which has produced a discontinuity in the zone. The case of a single break line in a discontinuity zone will be detailed hereafter. It will be observed that the process is generalizable to several break lines within one and the same zone.

The contour of the object is oriented so as to define an inside region (foreground region) and an outside region (background region). Several procedures, known per se, are applicable for finding this contour in step 13. If masks for segmenting the images of the sequence are already available, the contour is extracted on the basis of these masks. However, for most sequences, the segmentation masks are not available.

In this case, the image can be pre-segmented by a "mean shift" technique such as that described by Dorin Comaniciu and Peter Meer in "Mean Shift: A Robust Approach Toward Feature Space Analysis", IEEE Transactions on Pattern Analysis and Machine Intelligence, Vol. 24, No. 5, May 2002, pp. 603-619. Thereafter, a succession of dilatations and of morphological erosions makes it possible to eliminate the small segmented regions. The contour of the object is finally extracted from the segmented images.

The technique for detecting the salient points can also be applied in step 13. The salient points are positioned essentially on the contours of the objects. Since the list of salient points does not define a complete contour, it is appropriate to add a step of refinement of the contour on the basis of a chaining of these points. The salient points of an image I correspond to the pixels of I belonging to regions of high frequency. To detect them, it is possible to use wavelet theory. The wavelet transform is a multi-resolution representation of the image which makes it possible to express it at the various resolutions ½, ¼, etc. Thus, at each resolution level $2^j$ (j≤−1), the wavelet transform represents the image Im of size n×m=$2^k$×$2^l$ (k,l ∈Z), in the form of a group of images of size $2^{k+j}$×$2^{l+j}$, namely: a coarse image $A_{2^j}$·Im; an image $D_{2^j}^1$·Im of details representing the high vertical frequencies, that is to say the horizontal contours; an image $D_{2^j}^2$·Im details representing the high horizontal frequencies, that is to say the vertical contours; and an image $D_{2^j}^3$·Im of details representing the high diagonal frequencies, that is to say the corners.

Each of the three images of details is obtained from $A_{2^{j+1}}$·Im by a filtering followed by a sub-sampling by a factor of two in each direction (with $A_{2^0}$·Im=Im). In order to detect the salient points of an image, a wavelet basis and a minimum resolution level $2^r$ (r<=−1) are used firstly. Once the wavelet transformation has been performed, each of the three detail images $D_{2^j}^1$·Im, $D_{2^j}^2$·Im, $D_{2^j}^3$·Im is traversed so as to construct a tree of wavelet coefficients. This tree is based on the so-called "Zerotree" approach, known in the field of image coding. It makes it possible to put in place a saliency map of size $2^{k+r}$×$2^{l+r}$ reflecting the significance of each wavelet coefficient at the resolution $2^r$. Thus, a coefficient having a significant saliency corresponds to a region of Im exhibiting high frequencies. Specifically, a wavelet coefficient of significant modulus at the resolution $2^r$ corresponds to a contour of the image $A_{2^{r+1}}$·Im following a particular direction (horizontal, vertical or oblique). The Zerotree approach indicates that each of the wavelet coefficients at the resolution $2^r$ corresponds to a spatial zone of size $2^{-r}$×$2^{-r}$ in the image Im. On the basis of the saliency map constructed, it is thus possible to choose from among the $2^{-r}$×$2^{-r}$ pixels of Im, the pixel most representative of this zone.

Once these salient points have been determined in the discontinuity zone, they are linked together so as to have available a break line. For this purpose, it is possible to use a known technique of chaining of points or of interpolation or polynomial approximation (Newton, splines, Tchebicheff, least squares, etc.).

It should be noted that in step 13, the break lines are determined in each of the images of the group of images. The positions of these lines will be part of the motion parameters delivered in step 13 with a view to being communicated to the decoder.

In step 14 of the method, the discontinuity zones which have been detected in step 11 form the subject of a non-manifold remeshing. This remeshing is performed firstly at the finest hierarchical level.

Figure 4:
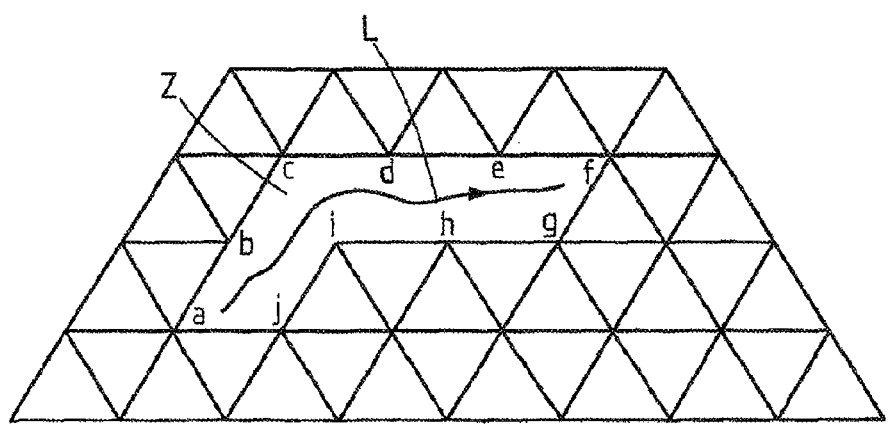
FIGS. 4 to 7 are diagrams illustrating a remeshing process used in an embodiment of the invention.

FIG. 4 shows an exemplary discontinuity zone Z, composed here of eight adjacent mesh cells of the initial triangular mesh. This mesh is constructed from equilateral triangles during its definition on the first image of the group. FIG. 4 shows an oriented break line L which has been determined in the zone Z in step 13.

The new mesh adopted in step 14 includes a regular part made up of the triangles of the initial mesh which belong to no discontinuity zone. In each discontinuity zone Z containing a break line L, two sub-meshes attached to the regular part along the edges of the discontinuity zone Z are generated. Each of these two sub-meshes is assigned to a side of the break line L, and it includes the nodes of the initial mesh that are situated on this side along the edges of the discontinuity zone Z.

Figure 5:
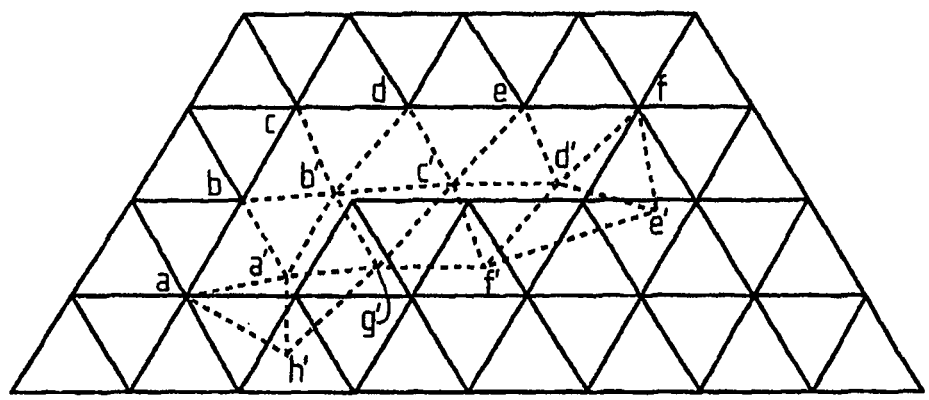
Figure 6:
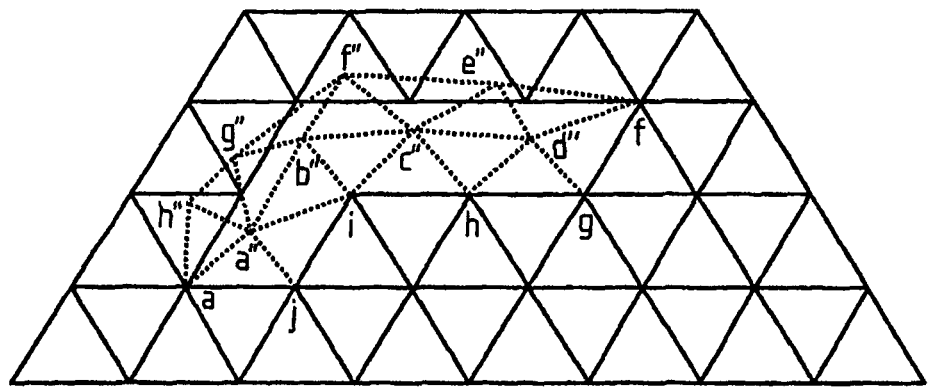

The dashed triangles in FIGS. 5 and 6 thus represent, respectively, two sub-meshes which can be generated in the discontinuity zone Z of FIG. 4. In this example, the nodes of the initial mesh denoted a, b, c, d, e, f in FIG. 4 belong to the "left" sub-mesh (that is to say attached to the initial mesh on the left side of the break line L, the left and right sides being defined in relation to the orientation determined for the break line L) shown in FIG. 5, and the nodes of the initial mesh denoted a, f, g, h, i, j in FIG. 4 belong to the "right" sub-mesh shown in FIG. 6.

Some of the nodes of the initial mesh which border the discontinuity zone are common to the two sub-meshes (here nodes a and f).

In the example of FIG. 5, the left sub-mesh comprises eight new nodes a'-h' and sixteen new triangles (a,a',h'), (a,b,a'), (b,b',a'), (b,c,b'), (c,d,b'), (d,c',b'), (d,e,c'), (e,d',c'), (e,f,d'), (f,e',d'), (d',e',f'), (c',d',f'), (c',f',g'), (b',c',g'), (a',b',g') and (a', g',h').

In the example of FIG. 6, the right sub-mesh comprises eight new nodes a"-h" and sixteen new triangles (a,h",a"), (j,a,a"), (i,j,a"), (i,a",b"), (i,b",c"), (h,i,c"), (h,c",d"), (g,h,d"), (f,g,d"), (f,d",e"), (c",e",d") c",f",e"), (b",f",c"), (b",g",f"), (a",g",b") and (a",h",g").

The additional nodes generated in the new sub-meshes can have positions in the first image that coincide with those of nodes of the initial mesh. They have been represented shifted in FIGS. 5 and 6 to facilitate the reading of the drawing.

The nodes of the edges at the borders of the discontinuity zone Z crossed by the discontinuity line L are boundary nodes which may only move with the initial mesh. These boundary nodes can be of three types:

left boundary nodes, serving as basis for just the left sub-mesh; they are the nodes b, c, d and e in FIGS. 4-6;

right boundary nodes, serving as basis for just the right sub-mesh; they are the nodes g, h, i and j in FIGS. 4-6; and shared boundary nodes, serving as basis for both sub-meshes; they are the nodes a and f in FIGS. 4-6.

When the break line L crosses a triangle having at least one boundary node as vertex, this node is identified as being left or right boundary as a function of its position with respect to the oriented line. For a triangle where the break line L terminates, it is for example possible to identify the nodes situated on the edge crossed by the line L as left and right boundary nodes and the third node as shared boundary node (as in FIGS. 4-6). Another possibility is to lengthen the break line by extrapolation until it encounters an edge of the triangle, and to identify the nodes situated on this edge as shared boundary nodes and the third node as left or right boundary node as a function of its position with respect to the oriented line.

In order to take into account the possible exposures that may occur in the video sequence, the new mesh cells extend beyond the discontinuity zone Z as shown by FIGS. 5 and 6. Mesh cells of the regular part and mesh cells of the sub-meshes then overlap.

To avoid conflicts during the reconstruction of an image, a "z-order" procedure at the nodes is used, inspired by the "z-buffer" whose usage is well known in the field of tridimensional image synthesis. The adaptation to the non-manifold meshes used here is done by assigning the new nodes of each sub-mesh a depth value z, positive or negative, assigned to this sub-mesh.

Figure 7:
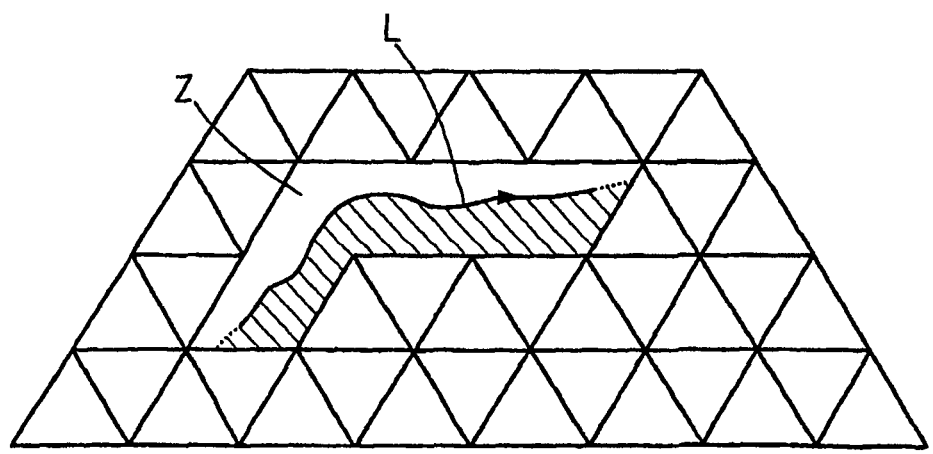

The nodes of the initial mesh which are preserved receive the depth value z=0. A value z>0 generally corresponds to an object in the foreground, and a value z<0 to an object in the background. The sign of z is given by the orientation of the break line L. The foreground object, whose contour corresponds to the break line, is positioned in relation to the orientation of the line L (for example to the right of the line when traveling in the sense of its orientation). Thus, in the case of FIGS. 4-7, the hatched portion in FIG. 7 belongs to the object whose break line L constitutes the contour.

This value z at the nodes makes it possible to calculate at each point of a mesh cell a value of z by an interpolation technique (affine for example). During the reconstruction of a point capable of being reconstructed by several mesh cells, a value z is calculated at this point for these various mesh cells, and these values are compared so as to retain the mesh cell giving the largest value z. This makes it possible to favor the objects in the foreground with respect to the background.

When several break lines appear in a discontinuity zone, there are more than two planes in the corresponding portion of the sequence of images. Detection of the break lines makes it possible to position the various planes, and they are assigned differentiated values z. The above procedure then makes it possible to select the relevant mesh cell for the reconstruction of each point of the image. The values z at the nodes are positioned so as to best reconstruct the image for which the mesh cells have been introduced. The positioning can be done with the aid of an iterative algorithm of the ICM ("Iterative Condition Mode") type, seeking to minimize the mean square error between the initial image and the reconstructed image. When there are several break lines in a discontinuity zone, the values z which have been determined for the corresponding sub-meshes form part of the parameters of the motion to be transmitted to the decoder.

Once the remeshing has been effected at the finest level, the discontinuity that a break line L represents is backtracked up through the higher levels until it disappears at a certain level. So long as the discontinuity exists on a mesh level, the discontinuity zone defined on this level is remeshed by taking account of the remeshing of the lower level to preserve the hierarchy of the mesh.

Figure 8:
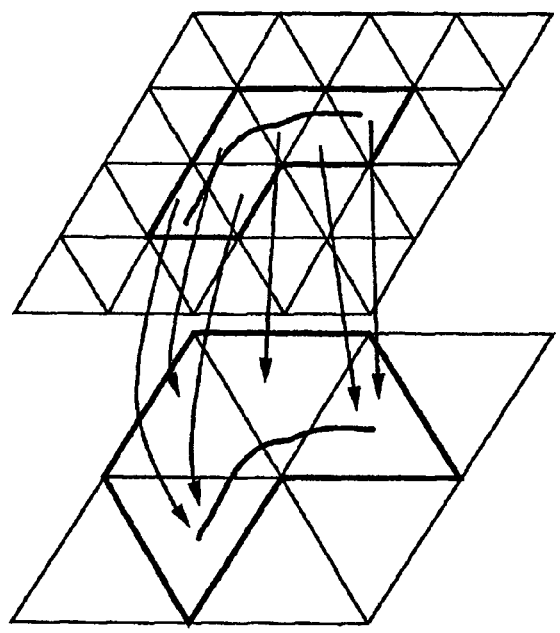
FIG. 8 is a diagram illustrating the definition of a discontinuity zone in higher levels of a hierarchical mesh once it has been determined at the finest level.
Figure 9A:
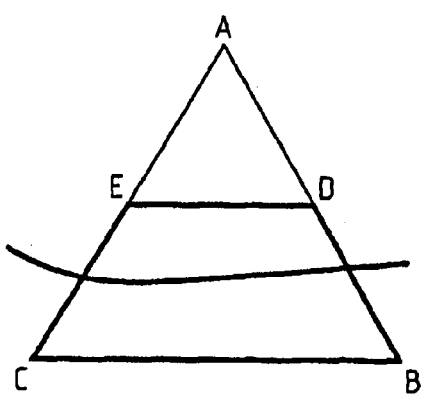
Figure 9B:
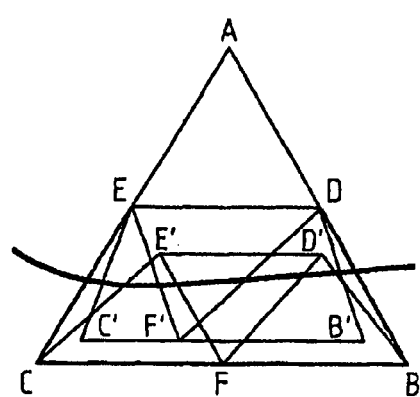
Figure 9C:
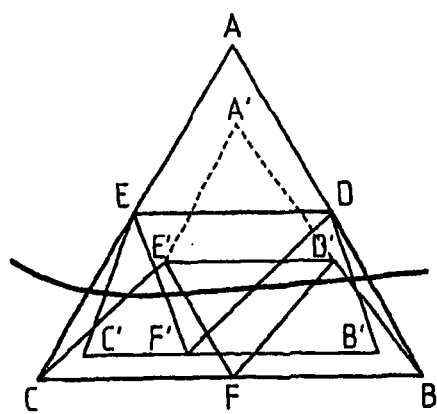
Figure 9D:
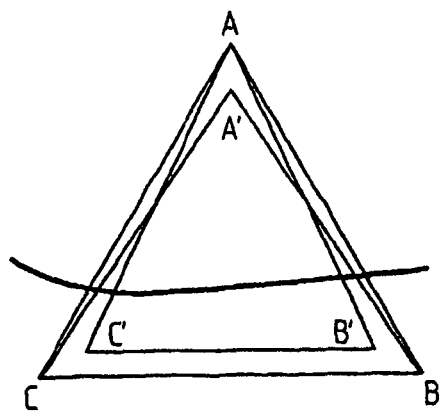
Figure 10A:
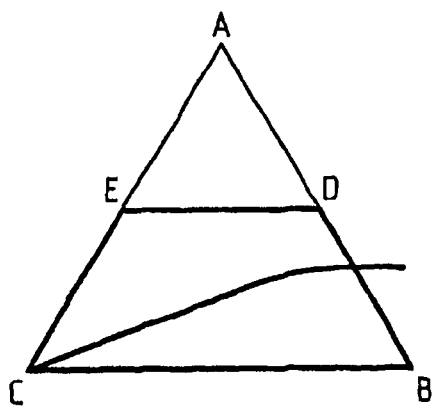
Figure 10B:
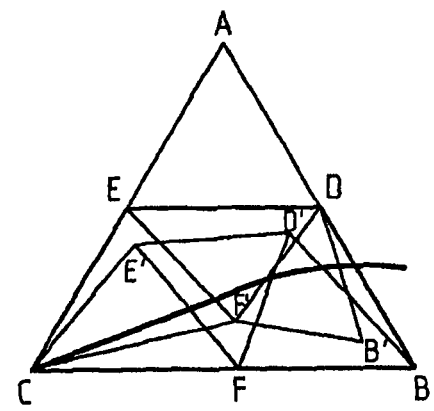
Figure 10C:
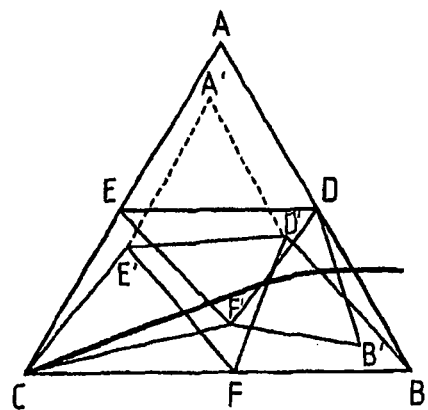
Figure 10D:
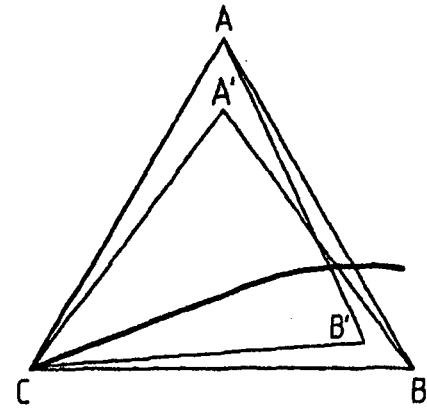

The backtracking of the discontinuity up through the hierarchy comprises two steps: determining the discontinuity zone for each level, and determining the constraints imposed on nodes at the border of the zone. Let nivfin be the finest level of the mesh at which the remeshing was done initially. If, for a level n less than or equal to nivfin, the discontinuity zone has been detected, the discontinuity zone at level n−1 is defined by the set of parent mesh cells of the mesh cells of the zone of occlusion of level n, as shown by FIG. 8.

The constraint of the boundary nodes shared by the two sub-meshes is backtracked up through the hierarchy, for example according to the following algorithm. For a node m constituting a shared boundary node at level n, if m has a parent p at level n−1, p becomes shared boundary node at level n−1;

otherwise, let A be the edge through which the break line L penetrates into the triangle of level n−1, q the mesh cell node situated opposite this edge. The break line L is lengthened artificially as far as q, and this node q becomes shared boundary node for level n−1.

The creation of a new mesh cell for a hierarchy level n−1 lower than a level n which has already been remeshed, can be of three types:

1/FIGS. 9a-d: the break line L completely crosses the mesh cell ABC belonging to the discontinuity zone at level n−1.

The boundary nodes for the right side being C and B, a new node A' is created at level n−1. The new mesh cell A'BC of level n−1 takes as daughter mesh cells the mesh cells A'E'D', E'CF, D'FB and E'D'F of level n, where F is the middle of the edge B-C and D' and E' are the nodes which have been created by the remeshing of the right side at level n. The mesh cell A'E'D' pertains to level n even if it was not generated during the remeshing at level n, but such must be the case at the higher level n−1. Likewise, for the doubling up of the left side, the boundary node is A, nodes B', C' and F' having been created by the remeshing of level n−1. The new mesh cell AB'C' of level n−1 has as daughter mesh cells AED, EC'F', EDF' and DF'B' at level n, where D and E are respectively the middles of the edges A-B and A-C.

2/FIGS. 10a-d: the break line L crosses the mesh cell ABC belonging to the discontinuity zone at level n−1, terminating on node C.

This case resembles case 1/, with the difference that node C becomes shared boundary node. For the remeshing of the right side at level n−1, C and B (for example) are boundary nodes, and node A' is created. The new mesh cell A'BC of level n−1 has as daughter mesh cells the mesh cells A'E'D', E'CF, D'FB and E'D'F of level n, including mesh cell A'E'D' added during the remeshing at level n. For the doubling up of the left side, C and A are boundary nodes, and node B' is created. The new mesh cell AB'C of level n−1 has as daughter mesh cells AED, ECF', EF'D and DF'B' at level n.

At level n, the break line is artificially lengthened either as far as node C opposite the edge E-F that it crosses on entering the mesh cell, thereby coming back to the case of FIGS. 10a-d, or as far as an edge (E-F in FIG. 11a) opposite the entrant edge. E and F are then shared boundary nodes at level n. When the higher hierarchical level of the mesh (n−1) is considered, the break line L is lengthened towards a node or edge (case similar to what has just been seen for the finer level n). In FIG. 11d, the contour has been lengthened onto node C. For the remeshing of the right side, C and B are boundary nodes, and node A' is created. The mesh cell A'BC of level n−1 has as daughter mesh cells A'ED', ED'F, EFC and D'FB at level n. The mesh cell A'ED' pertains to level n even if it was not generated during the remeshing at level n, but such must be the case at the higher level n−1. For the remeshing of the left side, the boundary nodes are C and A, and node B' is created. The mesh cell ACB' of level n−1 has as daughter mesh cells AED, ECF, EDF and DFB' at level n. It is noted that in this case, the mesh cell ECF of level n is shared by the mesh cells A'BC and ACB'.

When the break line is completely contained in a mesh cell, it disappears at the higher level. The new nodes introduced at the current level for the creation of the new mesh cell are defined by their barycentric coordinates in the parent mesh cell of the higher level. These nodes will thus have a global motion influenced by the nodes of the mesh cell of the higher level.

FIGS. 12a-c show the case of the disappearance of the break line. At level n, the break line has been lengthened as far as nodes B and C, which have thus become shared boundary nodes. The remeshing has introduced for the right side the nodes E' and D', and for the top side the node F'. At level n−1, the contour is completely contained in the mesh cell ABC. For the right side, node A' is introduced to form the mesh cell A'BC. For the left side, no node is introduced, the remeshing producing the initial mesh cell ABC. The mesh cell A'BC is constrained to move with the initial mesh ABC, so that the points A and A' at level n−1 are virtually the same. At level n, A' exists and is defined by its barycentric coordinates in ABC of level n−1.

The remeshing process is compatible with a geometric multi-grid approach, sometimes used for motion estimation so as to obtain a weighting between the nodes of successive hierarchical levels which takes account of the deformation of the lower mesh. In this case, the weighting of the nodes can be done as follows: (i) if the fine node is direct son of a coarse node, the weighting is 1; (ii) if the fine node arises from several coarse nodes, the weighting corresponds to the average of the barycentric weights of the fine node with respect to the coarse nodes.

Once the new mesh has been completed at all the hierarchical levels, the motion is re-estimated on the group of images in step 15. This re-estimation can be performed as in step 10, for example with the aid of formulae (1) to (6) above, with a precaution for the pixels capable of being reconstructed by several triangles of the new mesh. This ambiguity exists on account of the fact that certain triangular mesh cells of the new mesh overlap.

To resolve this ambiguity in the discontinuity zone, a visibility mask is defined at each time t. In the example illustrated previously, this mask corresponds to the hatched portion in FIG. 7. It is made up of the points which, at the instant t, are inside the discontinuity zone (that is to say belong to no mesh cell of the initial mesh that is reused in the new mesh) and are situated, for example, to the right of the oriented break line L determined for this time t. The points inside the discontinuity zone are capable of being reconstructed either by a triangle of the right sub-mesh, or by a triangle of the left sub-mesh. The triangle i, j, k employed for the application of formulae (3)-(5) to such a point is that of the right sub-mesh if the point belongs to the mask and that of the left sub-mesh otherwise.

The ambiguity also exists for certain points outside the discontinuity zone on account of the spillover of the sub-meshes. To resolve it, the values z are used as indicated previously so as to decide whether the sub-mesh which spills over out of the discontinuity zone is situated in the foreground or in the background. Thus, for a point outside the discontinuity zone and belonging to a triangle of a sub-mesh, we calculate the value z relating to each triangle of the mesh including this point and we select that which gives the largest value z for the application of formulae (3)-(5).

To improve the convergence of the minimization algorithm in step 15, it is possible to commence the gradient descent by initializing the displacement vectors at the preserved nodes of the initial mesh to the values which were obtained during the first estimation 10.

In the course of the re-estimation of the motion 15, it may happen that at an instant t, one of the nodes added at the remeshing step 14 does not reconstruct any point of the image. In this case, the minimization of the functional (1) does not afford any displacement vector for such a node. The displacement vector is then regenerated by interpolation of those obtained for neighboring nodes of the same sub-mesh.

Finally, the motion parameters delivered at step 20 when the image group comprises at least one discontinuity zone comprise:
 (a) the indication of the mesh cells of the initial mesh which belong to a discontinuity zone;
 (b) for each discontinuity zone, the location of at least one break line in each image of the group;
 (c) if a discontinuity zone contains more than one break line, an indication of the values z associated with the various sub-meshes generated in the zone, to designate the relative depth of the objects;
 (d) the displacement vectors at the nodes of the mesh, calculated in step 15.

The motion estimation such as described above is in particular usable in video coding applications. A simplified schematic diagram of a coder implementing the invention is presented in FIG. 13. Such a coder undertakes a motion estimation on a digital sequence of images of a video stream (module 36), and on the other hand a coding of the texture (module 37) which can be carried out according to various techniques known in the field of video coding. In a coder according to the invention, the module 36 operates according to the method described with reference to FIG. 3. The motion parameters (a)-(d) that it delivers form the subject of a coding by the module 38 before being inserted into the digital output stream of the coder by the module 39, with the texture coding information.

A signal carrying this output stream can be transmitted or broadcast on a communication channel. It can also form the subject of a recording on a recording medium such as an optical disk, a magnetic tape, etc.

With reference to FIG. 14, a video decoder compatible with such a coder receives an input stream similar to the output stream of the coder, and separates in this stream the motion parameters and the texture information (module 40). Modules 41 and 42 respectively process this information to decode the motion and the texture in the successive groups of images of the coded video sequence. The decoded motion and decoded texture are processed by a synthesis module 43 to reconstruct the video images.

The motion decoding module 41 operates as follows. The groups of images are firstly pinpointed in the sequence, as in a conventional decoder. On the basis of the initial mesh fixed by convention, the module 41 locates the discontinuity zones according to the information (a) above. It thereafter places the break lines in these discontinuity zones according to their location in the first image of the group (b). The module 41 then regenerates the non-manifold mesh by undertaking the remeshing of the discontinuity zones in accordance with step 14 previously described with reference to FIGS. 3 to 12. The quantified displacement vectors assigned to the nodes of the non-manifold mesh are indicated in the coded stream. To ascertain the displacement field of the image at each time t, the module 41 identifies the triangular mesh cell serving to synthesize the displacement vector of each point according to the same process as that used by the coder in step 15 previously described, according to the position of the point with respect to the break line (b) (if this point is situated in a discontinuity zone) and according to the values z indicative of the depth (c).

The coder according to FIG. 13, or the decoder according to FIG. 14, can be embodied in the form of a specific electronic circuit. However, it will very often be embodied in the form of piece of software. The steps of the methods described above are then controlled by instructions of a program executed by a processor of the video coding or decoding apparatus. For the coding, this apparatus can for example be a computer, a video camera, a work post of a television relay, a recording apparatus, etc. For the decoding, it can for example be a computer, a recording medium reader, a television signal receiver, an image display, etc.

The invention claimed is:

1. A method of estimating motion in a sequence of moving digital images, comprising the steps of:
   generating a first mesh using a processor, comprising mesh cells delimited by nodes, to be applied to a reference image of the sequence;
   estimating a first displacement field in a group of images including the reference image, by assigning to each point of an image a displacement value calculated according to values assigned to the nodes delimiting a mesh cell of the first mesh to which said point belongs;
   detecting at least one discontinuity zone in the first mesh by analyzing the first displacement field, each discontinuity zone including at least one mesh cell fulfilling a mesh cell deformation criterion in the group of images;
   in each detected discontinuity zone, determining at least one break line appearing in the group of images;
   generating a second mesh using a processor to be applied to the reference image, the second mesh comprising a regular part made up of mesh cells of the first mesh which belong to no discontinuity zone and, for each detected discontinuity zone of the at least one detected discontinuity zone, at least two sub-meshes which overlap in a region including the at least one break line determined in each detected discontinuity zone, each of the at least two sub-meshes comprising respective mesh cells delimited by nodes including nodes shared with the regular part, situated at a boundary of each detected discontinuity zone, and additional nodes not belonging to the regular part, the at least one break line being situated between the respective nodes of the at least two sub-meshes shared with the regular part; and
   estimating a second displacement field in the group of images, by assigning to each point situated in a detected discontinuity zone a displacement value calculated according to values assigned to the nodes delimiting a selected mesh cell of the second mesh to which a latter point belongs, the selected mesh cell depending on the position of said latter point with respect to the break line determined in said discontinuity zone;
   wherein respective depth values are assigned to the nodes of the regular part and to the additional nodes of each sub-mesh of the second mesh, the value assigned to the additional nodes of a latter sub-mesh generated for a detected discontinuity zone being dependent on the position of said latter sub-mesh with respect to the at least one break line determined in said detected discontinuity zone, and wherein the step of estimating the second displacement field comprises, for each point of an image belonging to a mesh cell of the regular part of the second mesh and to at least one mesh cell of a sub-mesh, calculating, for each mesh cell including at least one point of said each point of an image belonging to a mesh cell of the regular part of the second mesh and to at least one mesh cell of a sub-mesh, a weighted sum of the depth values respectively assigned to the nodes delimiting said mesh cell, and selecting, for the assignment of a displacement value to said each point of an image belonging to a mesh cell of the regular part of the second mesh and to at least one mesh cell of a sub-mesh, the mesh cell for which the weighted sum calculated is a maximum.

2. The method as claimed in claim 1, wherein each discontinuity zone is separated by the at least one break line into at least two parts respectively associated with the at least two sub-meshes, the at least two parts and the at least two sub-meshes having a same number of elements, and wherein for a first point situated in said at least one discontinuity zone and belonging to a plurality of mesh cells, a mesh cell of the sub-mesh associated with the part of the discontinuity zone where said first point is situated is selected.

3. The method as claimed in claim 1, wherein the first and second meshes are hierarchical meshes, the estimations of displacement fields being effected from a coarsest hierarchical level to a finest hierarchical level of the meshes, wherein the at least one discontinuity zone is detected as an adjoining set of mesh cells of the finest hierarchical level fulfilling the mesh cell deformation criterion, and wherein the at least one discontinuity zone is defined at the coarser hierarchical levels as being made up of at least one mesh cell including at least one respective mesh cell of the finest hierarchical level fulfilling the mesh cell deformation criterion.

4. The method as claimed in claim 1, wherein the first and second meshes are hierarchical meshes, the estimations of displacement fields being effected from a coarsest hierarchical level to a finest hierarchical level of the meshes, wherein the at least two sub-meshes of the second mesh are generated beginning with the finest hierarchical level nivFin, the mesh cells of the coarser hierarchical levels being thereafter generated during a progressive backtrack through the coarser hierarchical levels, the backtrack from a hierarchical level n to an immediately coarser hierarchical level n−1 comprising the following steps for each of the at least two sub-meshes and for 1<n≤nivFin:
   /a/ integrating each mesh cell of a sub-mesh previously defined at level n with a new mesh cell of said sub-mesh generated at level n−1;
   /b/ taking n'=n;
   /c/ if said new mesh cell of level n'−1 cannot be completed with mesh cells of said sub-mesh already generated at level n', generating at level n' at least one new mesh cell of said sub-mesh to complete said new mesh cell of level n'−1; and
   /d/ if n'<nivFin, increasing n' by one unit and repeating from step /c/.

5. A device for estimating motion in a sequence of moving digital images, comprising:
   a processor configured to execute the following algorithms:
   an algorithm for generating a first mesh, comprising mesh cells delimited by nodes, to be applied to a reference image of the sequence;
   an algorithm for estimating a first displacement field in a group of images including the reference image, comprising an algorithm for assigning to each point of an image a displacement value calculated according to values assigned to the nodes delimiting a mesh cell of the first mesh to which said point belongs;
   an algorithm for detecting at least one discontinuity zone in the first mesh by analyzing the first displacement field, each discontinuity zone including at least one mesh cell fulfilling a mesh cell deformation criterion in the group of images;
   an algorithm for determining, in each detected discontinuity zone, at least one break line appearing in the group of images;
   an algorithm for generating a second mesh to be applied to the reference image, the second mesh comprising a regular part made up of mesh cells of the first mesh which belong to no discontinuity zone and, for each detected discontinuity zone of the at least one detected discontinuity zone, at least two sub-meshes which overlap in a region including the at least one break line determined in each detected discontinuity zone, each of the at least two sub-meshes comprising respective mesh cells delimited by nodes including nodes shared with the regular part, situated at a boundary of each detected discontinuity zone, and additional nodes not belonging to the regular part, the at least one break line being situated between the respective nodes of the at least two sub-meshes shared with the regular part; and
   an algorithm for estimating a second displacement field in the group of images, comprising an algorithm for assigning to each point situated in a detected discontinuity zone a displacement value calculated according to values assigned to the nodes delimiting a selected mesh cell of the second mesh to which a latter point belongs, the selected mesh cell depending on the position of said latter point with respect to the at least one break line determined in said detected discontinuity zone;
   wherein respective depth values are assigned to the nodes of the regular part and to the additional nodes of each sub-mesh of the second mesh, the value assigned to the additional nodes of a latter sub-mesh generated for a detected discontinuity zone being dependent on the position of said latter sub-mesh with respect to the at least one break line determined in said detected discontinuity zone, and wherein the step of estimating the second displacement field comprises, for each point of an image belonging to a mesh cell of the regular part of the second mesh and to at least one mesh cell of a sub-mesh, calculating, for each mesh cell including at least one point of said each point of an image belonging to a mesh cell of the regular part of the second mesh and to at least one mesh cell of a sub-mesh, a weighted sum of the depth values respectively assigned to the nodes delimiting said mesh cell, and selecting, for the assignment of a displacement value to said each point of an image belonging to a mesh cell of the regular part of the second mesh and to at least one mesh cell of a sub-mesh, the mesh cell for which the weighted sum calculated is a maximum.

6. A non-transitory computer program product comprising a computer readable medium, having stored thereon a computer program comprising program instructions to be installed in an apparatus for processing moving images, comprising instructions for implementing the following steps when executing the program by a computing unit of said apparatus:
   generating a first mesh, comprising mesh cells delimited by nodes, to be applied to a reference image of the sequence;
   estimating a first displacement field in a group of images including the reference image, by assigning to each point of an image a displacement value calculated according to values assigned to the nodes delimiting a mesh cell of the first mesh to which said point belongs;
   detecting at least one discontinuity zone in the first mesh by analyzing the first displacement field, each discontinuity zone including at least one mesh cell fulfilling a mesh cell deformation criterion in the group of images;
   in each detected discontinuity zone, determining at least one break line appearing in the group of images;
   generating a second mesh to be applied to the reference image, the second mesh comprising a regular part made up of mesh cells of the first mesh which belong to no discontinuity zone and, for each detected discontinuity zone of the at least one detected discontinuity zone, at least two sub-meshes which overlap in a region including the at least one break line determined in each detected discontinuity zone, each of the at least two sub-meshes comprising respective mesh cells delimited by nodes including nodes shared with the regular part, situated at a boundary of each detected discontinuity zone, and additional nodes not belonging to the regular part, the at least one break line being situated between the respective nodes of the at least two sub-meshes shared with the regular part; and
   estimating a second displacement field in the group of images, by assigning to each point situated in a detected discontinuity zone a displacement value calculated according to values assigned to the nodes delimiting a selected mesh cell of the second mesh to which a latter point belongs, the selected mesh cell depending on the position of said latter point with respect to the at least one break line determined in said detected discontinuity zone;
   wherein respective depth values are assigned to the nodes of the regular part and to the additional nodes of each sub-mesh of the second mesh, the value assigned to the additional nodes of a latter sub-mesh generated for a detected discontinuity zone being dependent on the position of said latter sub-mesh with respect to the at least one break line determined in said detected discontinuity zone, and wherein the step of estimating the second displacement field comprises, for each point of an image belonging to a mesh cell of the regular part of the second mesh and to at least one mesh cell of a sub-mesh, calculating, for each mesh cell including at least one point of said each point of an image belonging to a mesh cell of the regular part of the second mesh and to at least one mesh cell of a sub-mesh, a weighted sum of the depth values respectively assigned to the nodes delimiting said mesh cell, and selecting, for the assignment of a displacement value to said each point of an image belonging to a mesh cell of the regular part of the second mesh and to at least one mesh cell of a sub-mesh, the mesh cell for which the weighted sum calculated is a maximum.

7. A video coder, comprising:
   a processor configured to execute an algorithm for estimating motion in a sequence of moving digital images and an algorithm for constructing an output stream including motion parameters produced by the motion estimation algorithm, wherein the algorithm for estimating motion comprises:

an algorithm for generating a first mesh, comprising mesh cells delimited by nodes, to be applied to a reference image of the sequence;

an algorithm for estimating a first displacement field in a group of images including the reference image, comprising an algorithm for assigning to each point of an image a displacement value calculated according to values assigned to the nodes delimiting a mesh cell of the first mesh to which said point belongs;

an algorithm for detecting at least one discontinuity zone in the first mesh by analyzing the first displacement field, each discontinuity zone including at least one mesh cell fulfilling a mesh cell deformation criterion in the group of images;

an algorithm for determining, in each detected discontinuity zone, at least one break line appearing in the group of images;

an algorithm for generating a second mesh to be applied to the reference image, the second mesh comprising a regular part made up of mesh cells of the first mesh which belong to no discontinuity zone and, for each detected discontinuity zone of the at least one detected discontinuity zone, at least two sub-meshes which overlap in a region including the at least one break line determined in each detected discontinuity zone, each of the at least two sub-meshes comprising respective mesh cells delimited by nodes including nodes shared with the regular part, situated at a boundary of each detected discontinuity zone, and additional nodes not belonging to the regular part, the at least one break line being situated between the respective nodes of the at least two sub-meshes shared with the regular part; and an algorithm for estimating a second displacement field in the group of images, comprising an algorithm for assigning to each point situated in a detected discontinuity zone a displacement value calculated according to values assigned to the nodes delimiting a selected mesh cell of the second mesh to which a latter point belongs, the selected mesh cell depending on the position of said latter point with respect to the at least one break line determined in said detected discontinuity zone;

wherein respective depth values are assigned to the nodes of the regular part and to the additional nodes of each sub-mesh of the second mesh, the value assigned to the additional nodes of a sub-mesh generated for a detected discontinuity zone being dependent on the position of a latter sub-mesh with respect to the at least one break line determined in a latter zone, and wherein the algorithm for estimating the second displacement field comprises an algorithm for calculating, for each point of an image belonging to a mesh cell of the regular part of the second mesh and to at least one mesh cell of a sub-mesh, and for each mesh cell including at least one point of the each point of an image belonging to a mesh cell of the regular part of the second mesh and to at least one mesh cell of a sub-mesh, a weighted sum of the depth values respectively assigned to the nodes delimiting said mesh cell, and an algorithm for selecting, for the assignment of a displacement value to said each point of an image belonging to a mesh cell of the regular part of the second mesh and to at least one mesh cell of a sub-mesh, the mesh cell for which the weighted sum calculated is a maximum.

8. The video coder as claimed in claim 7, wherein the motion parameters included in the output stream comprise:
parameters indicating the mesh cells of the first mesh making up each detected discontinuity zone;
positioning parameters of a break line determined in each detected discontinuity zone; and
parameters describing displacement values assigned to the nodes of the second mesh, said displacement values being obtained in the estimation of the second displacement field.

9. The video coder as claimed in claim 8, wherein the motion parameters included in the output stream further comprise parameters indicating depth values respectively assigned to the nodes of the regular part and to the additional nodes of each sub-mesh of the second mesh generated by the motion estimation algorithm.

10. The video coder as claimed in claim 7, wherein each discontinuity zone is separated by the at least one break line into at least two parts respectively associated with the at least two sub-meshes, the at least two parts and the at least two sub-meshes having a same number of elements and wherein the selected mesh cell for a first point situated in said discontinuity zone and belonging to a plurality of mesh cells, is a mesh cell of the sub-mesh associated with the part of the at least one discontinuity zone where said first point is situated.

11. The video coder as claimed in claim 7, wherein the first and second meshes are hierarchical meshes, the estimations of displacement fields being effected from a coarsest hierarchical level to a finest hierarchical level of the meshes, wherein the at least one discontinuity zone is detected as an adjoining set of mesh cells of the finest hierarchical level fulfilling the mesh cell deformation criterion, and wherein the at least one discontinuity zone is defined at the coarser hierarchical levels as being made up of at least one mesh cell including at least one respective mesh cell of the finest hierarchical level fulfilling the mesh cell deformation criterion.

12. The video coder as claimed in claim 7, wherein the first and second meshes are hierarchical meshes, the estimations of displacement fields being effected from a coarsest hierarchical level to a finest hierarchical level of the meshes, wherein the algorithm for generating the second mesh comprises an algorithm for generating the at least two sub-meshes beginning with the finest hierarchical level nivFin, the mesh cells of the coarser levels being thereafter generated during a progressive backtrack through coarser hierarchical levels, the backtrack from a hierarchical level n to an immediately coarser hierarchical level n−1 comprising the following steps for each of the sub-meshes and for $1 < n \leq nivFin$:

/a/ integrating each mesh cell of a sub-mesh previously defined at level n with a new mesh cell of said sub-mesh generated at level n−1;

/b/ taking n'=n;

/c/ if said new mesh cell of level n'−1 cannot be completed with mesh cells of said sub-mesh already generated at level n', generating at level n' at least one new mesh cell of said sub-mesh to complete said new mesh cell of level n'−1; and /d/ if n'<nivFin, increasing n' by one unit and repeating from step /c/.

13. A method of decoding motion in a sequence of moving digital images, with the aid of image meshes comprising mesh cells delimited by nodes, the method comprising the steps of:

receiving an input stream including motion parameters comprising, for a group of images including a reference image:

first motion parameters indicating, in a first mesh to be applied to the reference image, mesh cells making up at least one discontinuity zone in the group of images;

second motion parameters for positioning at least one break line in each discontinuity zone; and third motion parameters describing displacement values assigned to the nodes of a second mesh to be applied to the reference image, the second mesh comprising a regular part made up of mesh cells of the first mesh which belong to no discontinuity zone and, for at least one discontinuity zone, at least two sub-meshes which overlap in a region including the at least one break line positioned in said at least one discontinuity zone, each of the at least two sub-meshes comprising respective mesh cells delimited by nodes including nodes shared with the regular part, situated at a boundary of the at least one discontinuity zone, and additional nodes not belonging to the regular part, the at least one break line being situated between the respective nodes of the at least two sub-meshes shared with the regular part;

generating the second mesh using a processor on the basis of the first and second motion parameters; and generating a displacement field in the group of images, by assigning to each node of the second mesh displacement values obtained on the basis of the third motion parameters and by assigning to each point situated in a detected discontinuity zone a displacement value calculated according to the values assigned to the nodes delimiting a selected mesh cell of the second mesh to which a latter point belongs, the selected mesh cell depending on the position of said latter point with respect to the at least one break line determined in said detected discontinuity zone;

wherein the motion parameters of the input stream further comprise depth values respectively assigned to the nodes of the regular part and to the additional nodes of each sub-mesh of the second mesh, the value assigned to the additional nodes of a latter sub-mesh corresponding to a discontinuity zone being dependent on the position of said latter sub-mesh with respect to the at least one break line positioned in a latter zone, and wherein the step of generating the displacement field comprises for each point of an image belonging to a mesh cell of the regular part of the second mesh and to at least one mesh cell of a sub-mesh, calculating, for each mesh cell including at least one point of said each point belonging to a mesh cell of the regular part of the second mesh, a weighted sum of the depth values respectively assigned to the nodes delimiting said mesh cell, and selecting, for the assignment of a displacement value to said each point belonging to a mesh cell of the regular part of the second mesh, the mesh cell for which the weighted sum calculated is a maximum.

14. The method as claimed in claim 13, wherein the at least one discontinuity zone is separated by the at least one break line into at least two parts respectively associated with the at least two sub-meshes, the at least two parts and the at least two sub-meshes having a same number of elements, and wherein for a first point situated in said at least one discontinuity zone and belonging to a plurality of mesh cells, a mesh cell of the sub-mesh associated with the part of the at least one discontinuity zone where said first point is situated is selected.

15. A device for decoding motion in a sequence of moving digital images, with the aid of image meshes comprising mesh cells delimited by nodes, the device comprising:

a processor configured to execute the following algorithms:

an algorithm for receiving an input stream including motion parameters comprising, for a group of images including a reference image:

first motion parameters indicating, in a first mesh to be applied to the reference image, mesh cells making up at least one discontinuity zone in the group of images;

second motion parameters for positioning at least one break line in each discontinuity zone; and third motion parameters describing displacement values assigned to the nodes of a second mesh to be applied to the reference image, the second mesh comprising a regular part made up of mesh cells of the first mesh which belong to no discontinuity zone and, for at least one discontinuity zone, at least two sub-meshes which overlap in a region including the at least one break line positioned in said at least one discontinuity zone, each of the at least two sub-meshes comprising respective mesh cells delimited by nodes including nodes shared with the regular part, situated at a boundary of the at least one discontinuity zone, and additional nodes not belonging to the regular part, the at least one break line being situated between the respective nodes of the at least two sub-meshes shared with the regular part;

an algorithm for generating the second mesh on the basis of the first and second motion parameters; and an algorithm for generating a displacement field in the group of images, comprising an algorithm for assigning to each node of the second mesh displacement values obtained on the basis of the third motion parameters and by assigning to each point situated in a detected discontinuity zone a displacement value calculated according to the values assigned to the nodes delimiting a selected mesh cell of the second mesh to which a latter point belongs, the selected mesh cell depending on the position of said latter point with respect to the at least one break line determined in said detected discontinuity zone;

wherein the motion parameters of the input stream further comprise depth values respectively assigned to the nodes of the regular part and to the additional nodes of each sub-mesh of the second mesh, the value assigned to the additional nodes of a latter sub-mesh corresponding to a discontinuity zone being dependent on the position of said latter sub-mesh with respect to the at least one break line positioned in a latter zone, and wherein the step of generating the displacement field comprises for each point of an image belonging to a mesh cell of the regular part of the second mesh and to at least one mesh cell of a sub-mesh, calculating, for each mesh cell including at least one point of said each point belonging to a mesh cell of the regular part of the second mesh, a weighted sum of the depth values respectively assigned to the nodes delimiting said mesh cell, and selecting, for the assignment of a displacement value to said each point belonging to a mesh cell of the regular part of the second mesh, the mesh cell for which the weighted sum calculated is a maximum.

16. A non-transitory computer program product comprising a computer readable medium, having stored thereon a computer program comprising program instructions to be installed in an apparatus for processing moving images, comprising instructions for decoding motion in a sequence of moving digital images with the aid of image meshes comprising mesh cells delimited by nodes, said instructions implementing the following steps when executing the program by a computing unit of said apparatus:

receiving an input stream including motion parameters comprising, for a group of images including a reference image:
: first motion parameters indicating, in a first mesh to be applied to the reference image, mesh cells making up at least one discontinuity zone in the group of images;
: second motion parameters for positioning at least one break line in each discontinuity zone; and
: third motion parameters describing displacement values assigned to the nodes of a second mesh to be applied to the reference image, the second mesh comprising a regular part made up of mesh cells of the first mesh which belong to no discontinuity zone and, for at least one discontinuity zone, at least two sub-meshes which overlap in a region including the at least one break line positioned in said at least one discontinuity zone, each of the at least two sub-meshes comprising respective mesh cells delimited by nodes including nodes shared with the regular part, situated at a boundary of the at least one discontinuity zone, and additional nodes not belonging to the regular part, the at least one break line being situated between the respective nodes of the at least two sub-meshes shared with the regular part;

generating the second mesh using a processor on the basis of the first and second motion parameters; and generating a displacement field in the group of images, by assigning to each node of the second mesh displacement values obtained on the basis of the third motion parameters and by assigning to each point situated in a detected discontinuity zone a displacement value calculated according to the values assigned to the nodes delimiting a selected mesh cell of the second mesh to which a latter point belongs, the selected mesh cell depending on the position of said latter point with respect to the at least one break line determined in said detected discontinuity zone;

wherein the motion parameters of the input stream further comprise depth values respectively assigned to the nodes of the regular part and to the additional nodes of each sub-mesh of the second mesh, the value assigned to the additional nodes of a latter sub-mesh corresponding to a discontinuity zone being dependent on the position of said latter sub-mesh with respect to the at least one break line positioned in a latter zone, and wherein the step of generating the displacement field comprises for each point of an image belonging to a mesh cell of the regular part of the second mesh and to at least one mesh cell of a sub-mesh, calculating, for each mesh cell including at least one point of said each point belonging to a mesh cell of the regular part of the second mesh, a weighted sum of the depth values respectively assigned to the nodes delimiting said mesh cell, and selecting, for the assignment of a displacement value to said each point belonging to a mesh cell of the regular part of the second mesh, the mesh cell for which the weighted sum calculated is a maximum.

17. A video decoder, comprising:
a processor configured to execute a motion decoding algorithm and a synthesis algorithm for constructing a sequence of moving digital images taking into account a displacement field generated by the motion synthesis algorithm, wherein the motion decoding algorithm is arranged to process the images with the aid of image meshes comprising mesh cells delimited by nodes and comprises:
: an algorithm for receiving an input stream including motion parameters comprising, for a group of images including a reference image:
: : first motion parameters indicating, in a first mesh to be applied to the reference image, mesh cells making up at least one discontinuity zone in the group of images;
: : second motion parameters for positioning at least one break line in each discontinuity zone; and
: : third motion parameters describing displacement values assigned to the nodes of a second mesh to be applied to the reference image, the second mesh comprising a regular part made up of mesh cells of the first mesh which belong to no discontinuity zone and, for at least one discontinuity zone, at least two sub-meshes which overlap in a region including the at least one break line positioned in said at least one discontinuity zone, each of the at least two sub-meshes comprising respective mesh cells delimited by nodes including nodes shared with the regular part, situated at a boundary of the at least one discontinuity zone, and additional nodes not belonging to the regular part, the at least one break line being situated between the respective nodes of the at least two sub-meshes shared with the regular part;
: an algorithm for generating the second mesh on the basis of the first and second motion parameters; and
: an algorithm for generating a displacement field in the group of images, comprising an algorithm for assigning to each node of the second mesh displacement values obtained on the basis of the third motion parameters and by assigning to each point situated in a detected discontinuity zone a displacement value calculated according to the values assigned to the nodes delimiting a selected mesh cell of the second mesh to which said each point belongs, the selected mesh cell depending on the position of said each point with respect to the at least one break line determined in said detected discontinuity zone;

wherein the motion parameters of the input stream further comprise depth values respectively assigned to the nodes of the regular part and to the additional nodes of each sub-mesh of the second mesh;

wherein, for the additional nodes of a latter sub-mesh corresponding to a first discontinuity zone, the value assigned is dependent on the position of said latter sub-mesh with respect to a break line in a set formed of the at least one break line positioned in the first discontinuity zone, and wherein the algorithm for generating the displacement field comprise an algorithm for calculating, for each point of an image belonging to a mesh cell of the regular part of the second mesh and to at least one mesh cell of a sub-mesh, and for each mesh cell including at least one point of said each point of an image belonging to a mesh cell of the regular part of the second mesh and to at least one mesh cell of a sub-mesh, a weighted sum of the depth values respectively assigned to the nodes delimiting said mesh cell, and an algorithm for selecting, for the assignment of a displacement value to said each point of an image belonging to a mesh cell of the regular part of the second mesh and to at least one mesh cell of a sub-mesh, the mesh cell for which the weighted sum calculated is a maximum.

18. The video decoder as claimed in claim 17, wherein each discontinuity zone is separated by the at least one break line into at least two parts respectively associated with the at least two sub-meshes, the at least two parts and the at least two sub-meshes having a same number of elements, and wherein the selected mesh cell for a first point situated in said at least one discontinuity zone and belonging to a plurality of mesh cells, is a mesh cell of the sub-mesh associated with the part of the at least one discontinuity zone where said first point is situated.

* * * * *